Patented Oct. 2, 1945

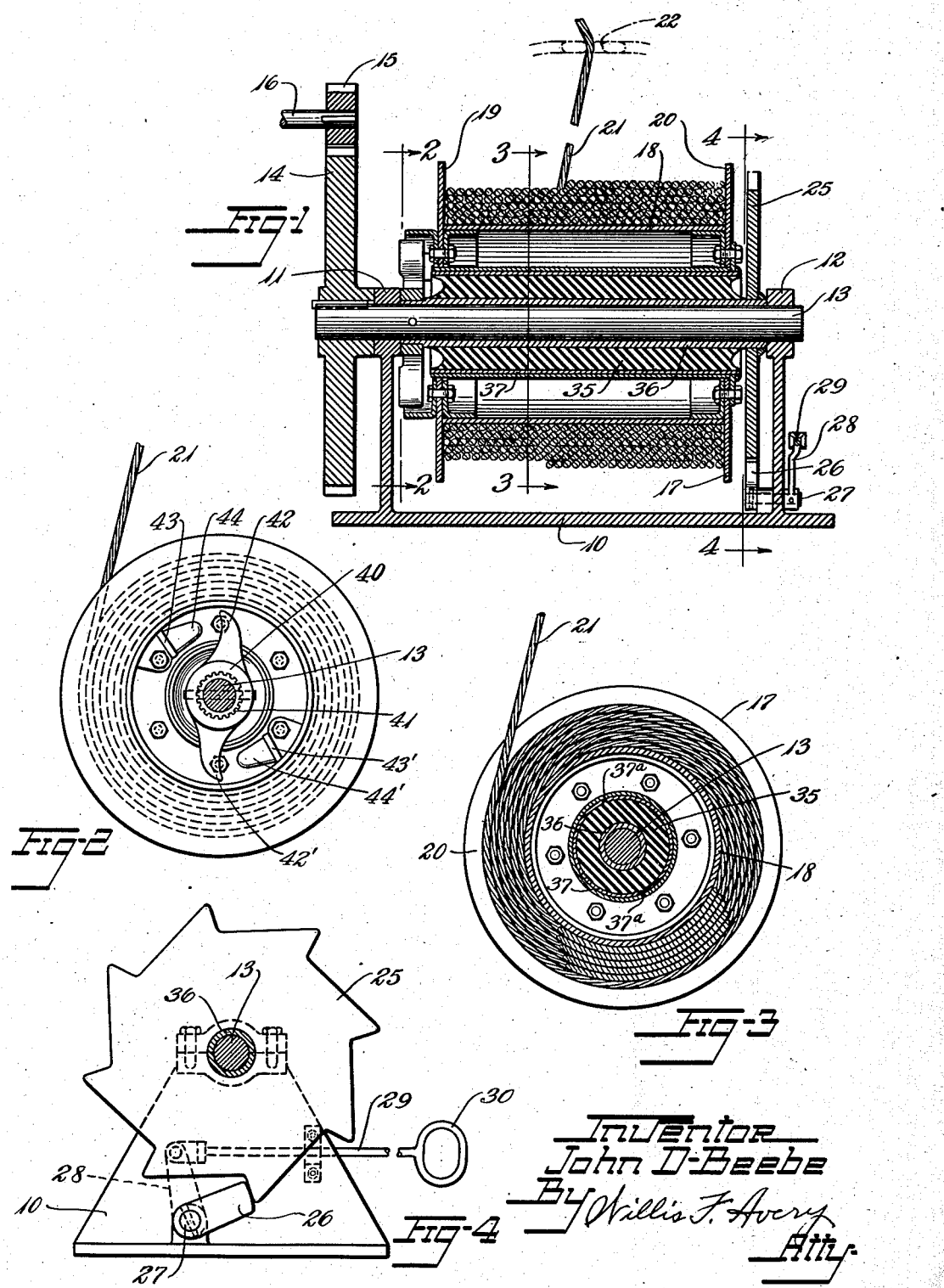

2,386,086

UNITED STATES PATENT OFFICE 2,386,086

REELING APPARATUS

John D. Beebe, Silver Lake, Ohio, assignor to The B. F. Goodrich Company, New York, N. Y., a corporation of New York Application April 22, 1943, Serial No. 484,043

1 Claim. (Cl. 242—117)

This invention relates to reeling apparatus and is useful especially in connection with the reeling of cable, cord or the like where the cable is subjected to suddenly applied loads, or suddenly increased loads while under tension.

In reels, winches, windlasses and the like where a line such as a cable, cord, chain, or wire is wound about a drum and unyieldingly locked against unwinding severe stress is placed upon the line by forces suddenly applied thereto due to rapid variation of tension, such as occurs when a ship, buoy, mine, or other object anchored by the line is shifted by the wind, the force of waves, or other disturbing force. Such suddenly applied loads have often caused breakage or serious weakening of the line, and this difficulty has been aggravated in cases where the line has been faired through or about guides or fair leads owing to the added bending stress on the line at such places.

The principal objects of this invention are to provide effectively for cushioning of the line against suddenly applied loads, to provide torsional cushioning of the reel, to provide radial cushioning thereof, to reduce wear and breakage of the line, to utilize effectively the advantages of rubber or other rubber-like material for the purpose, and to provide simplicity of construction and convenience of assembly.

These and other objects will appear from the following description and the accompanying drawing.

Of the drawing,

Fig. 1 is a central vertical cross sectional view of a reeling apparatus constructed in accordance with and embodying the invention, parts being broken away.

Fig. 2 is a sectional view thereof, taken on line 2—2 of Fig. 1.

Fig. 3 is a sectional view thereof, taken on line 3—3 of Fig. 1.

Fig. 4 is a sectional view thereof, taken on line 4—4 of Fig. 1.

Referring to the drawing which shows a reeling apparatus constructed in accordance with and embodying the invention, the numeral 10 designates a supporting frame having aligned bearings 11, 12 for rotatably supporting a reel spindle 13. A driving gear 14 may be fixed to the spindle 13 and adapted to be driven by any convenient means such as a pinion 15 fixed to a jack shaft 16.

The reel 17 is mounted upon the spindle 13 in a manner hereinafter described for rotation with it and has a cylindrical drum 18 and end flanges 19, 20 for reeling a supply line 21 wound thereon. The line 21 may be a cable, cord, chain, or wire and may be guided to and from the reel by a fair lead or guide 22.

For locking the spindle of the reel against rotation in a direction to unwind or pay off the line, suitable mechanism is provided which for example may include a ratchet wheel 25 fixed to the spindle. A dog 26 is pivotally mounted on a shaft 27 having a bearing in the frame 10. A lever 28 is fixed to the shaft. A rod 29 is slideably mounted on the frame 10 and is pivotally connected to the lever 28. A handle 30 is provided on the rod. The arrangement is such that by throwing the handle to the right as seen in Fig. 4 the dog 26 is released from the ratchet wheel and by throwing it in the opposite direction the dog is engaged by the sprocket to arrest rotation of the spindle.

For supporting the reel 17 from the spindle 13 while cushioning the line 21 the reel is mounted upon cushion means. The cushioning means is preferably in the form of resilient torsion cushioning means of rubber or other rubber-like material. In the illustrative embodiment of the drawings, the cushioning means comprises a resilient bushing 35 of rubber-like material bonded as by vulcanization or otherwise secured about a sleeve 36 which is in turn fixed to the spindle 13. The outer face of the resilient bushing 35 is also preferably bonded as by vulcanization or may be otherwise secured to an outer sleeve 37 which is fixed to the reel 17. The outer sleeve may be circumferentially discontinuous as by making it of split construction if desired, as is indicated at 37a, 37a, and the bushing may be inserted in the reel 17 under radial compression, thereby relieving the cushion member of radial tension such as might weaken the bond with the metal, and thus increasing its life under stress.

The outer sleeve of the cushioning bushing is secured to the reel 17 so that the reel is supported for cushioning movement circumferentially of the spindle 13, and also somewhat in the radial extent as may be permitted by the resilient material.

For limiting rotation of the reel with respect to the spindle, a dog 40 is fixed to the spindle 13 and for this purpose may be splined as at 41 to fit a splined surface of the inner shell, the arrangement being such that the dog may be secured to the sleeve in a plurality of rotatively adjustable positions. The dog has tails 42, 42' which standing circumferentially in the path of stops 43, 43' fixed to the reel. For cushioning contact of the dog with the stops, the stops 43, 43' may be provided with rubber or other resilient compressible cushioning elements such as the bumpers 44, 44'. The arrangement is such that with the spindle locked against rotation, the reel 17 may be rotated about the locked spindle 13 under pull on the line 21 due to torsional distortion of the resilient bushing 35 until, in extreme movement, the dog 40 engages the bumpers 44, 44'. Thereafter resistance to rotation increases more rapidly as the bumpers 44, 44' are compressed. In use, the spindle 13 may be locked by the ratchet wheel 25 engaging the dog 26 when a desired amount of line has been let out, and when a load is applied suddenly to the line 21, the reel is rotated about the spindle, the bushing 35 resisting rotation resiliently and also cushioning the reel by some radial deflection. Resistance to rotation increases gradually with angular movement and where the load is excessive the dog 40 eventually contacts the bumpers 44, 44' whereupon resistance to movement greatly increases until a balanced condition is reached. The shock of sudden loading of the line 21 under tension is thus greatly reduced, and the reduction of shock stress is especially beneficial where the line is particularly vulnerable, as where it is bent under tension against a fair lead 22. The dog 40 may be set with respect to the spindle so as to provide the desired amount of angular deflection before it contacts the bumpers within the limit of stress of the resilient material. When it is desired to reel in the line, the spindle 13 is rotated in a reeling direction and the reel is propelled by the spindle through the torsion bushing so that the line is cushioned also during reeling.

Variations may be made without departing from the scope of the invention as it is defined by the following claim.

I claim:

Reeling apparatus comprising a reel having a winding drum for storing a line, an inner member extending therethrough, a sleeve fixed within said reel about and in radially spaced relation to said inner member, said sleeve being circumferentially discontinuous, and a body of resilient rubber-like material disposed radially between said sleeve and said inner member and extending axially along the same, said body being mounted under radial compression within said reel and being secured to said inner member and said sleeve for resisting pull of a line upon said reel by rotative distortion of said body, and said body by virtue of its disposition radially within said drum providing strong torsional force on said body under line pull on said drum.

JOHN D. BEEBE.